H. E. COFFIN.
BEARING.
APPLICATION FILED APR. 13, 1908.
1,026,849.
Patented May 21, 1912.
2 SHEETS—SHEET 2.
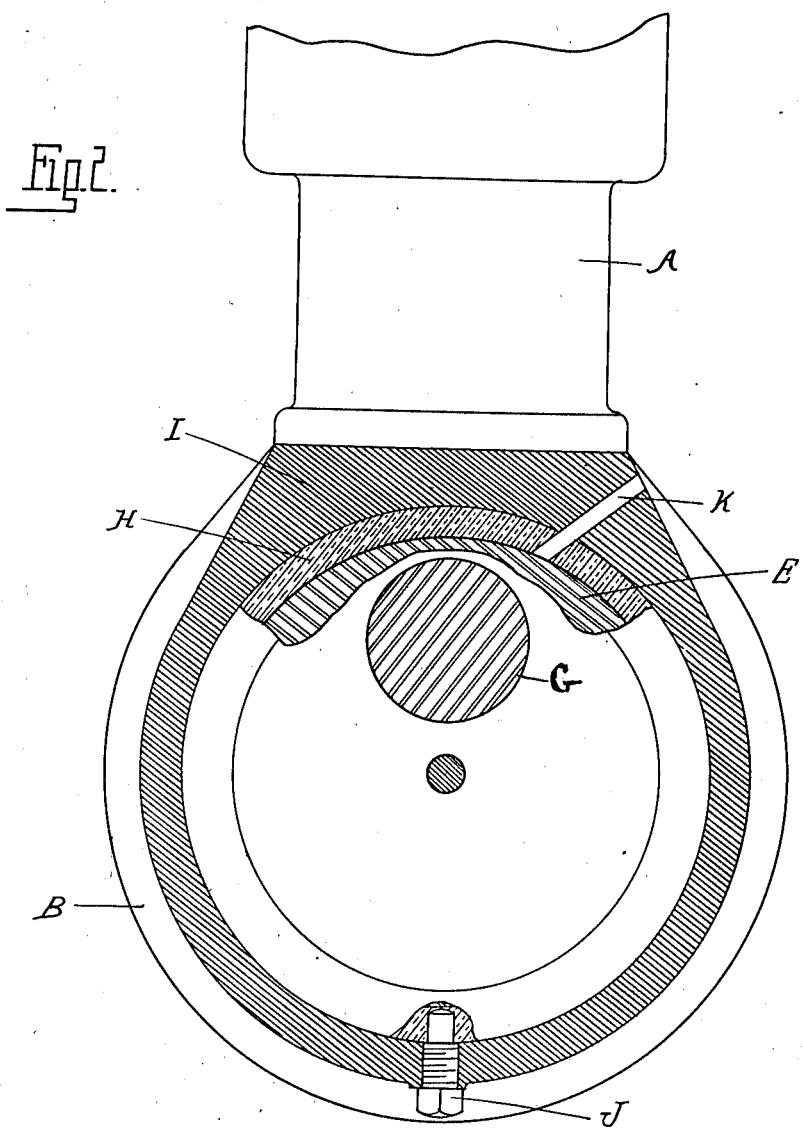

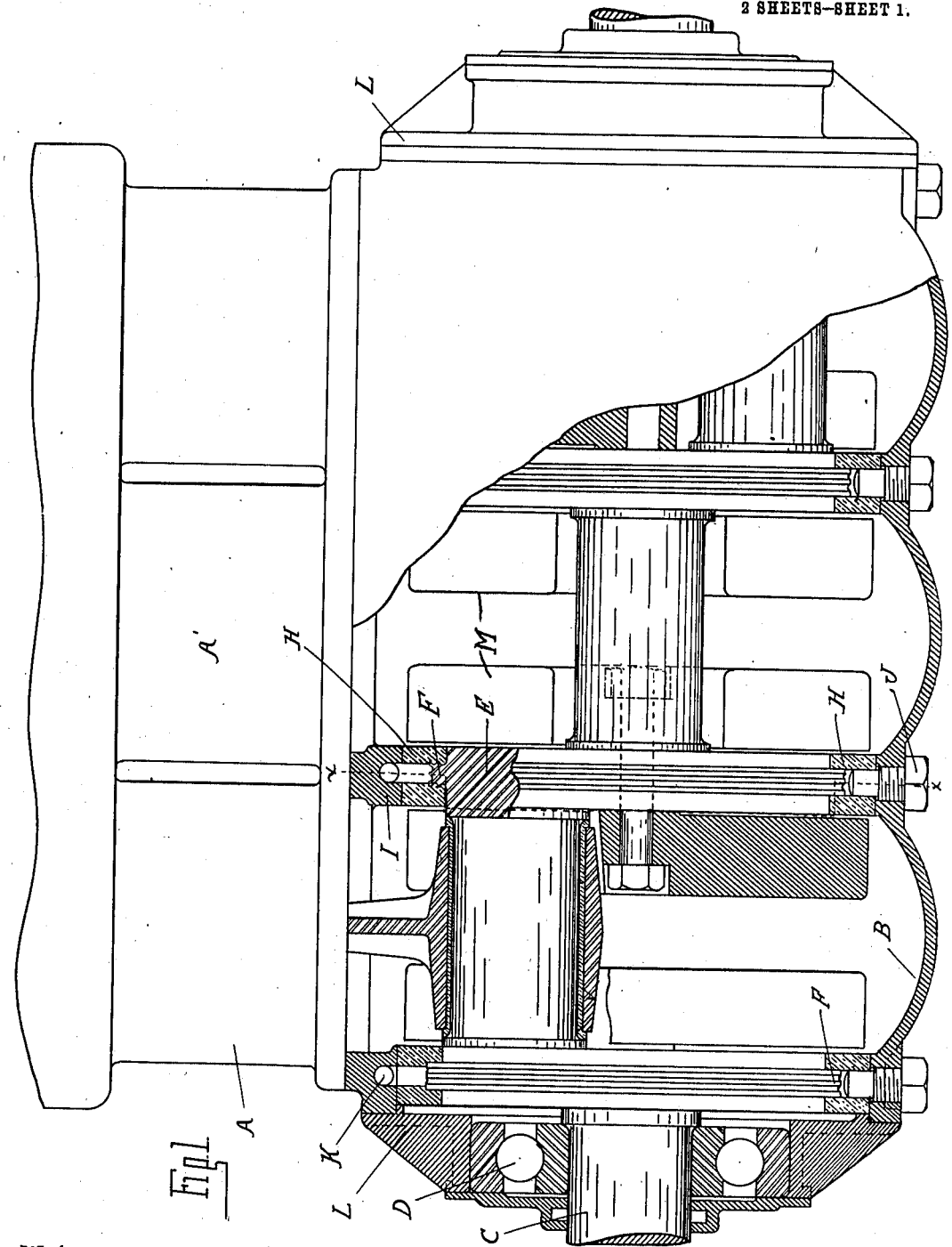

UNITED STATES PATENT OFFICE.

HOWARD E. COFFIN, OF DETROIT, MICHIGAN, ASSIGNOR TO CHALMERS MOTOR COMPANY, OF DETROIT, MICHIGAN, A CORPORATION OF MICHIGAN.

BEARING.

1,026,849.

Specification of Letters Patent.   Patented May 21, 1912.

Application filed April 13, 1908.   Serial No. 426,758.

*To all whom it may concern:*

Be it known that I, HOWARD E. COFFIN, a citizen of the United States of America, residing at Detroit, in the county of Wayne and State of Michigan, have invented certain new and useful Improvements in Bearings, of which the following is a specification, reference being had therein to the accompanying drawings.

The invention relates to engines of that type in which a plurality of cylinders are connected to a common crank case.

It is the object of the invention to provide means for dividing the crank case into separate chambers communicating with each of the cylinders and at the same time to permit of readily removing the crank shaft from the end of the case.

To this end the invention consists in the construction as hereinafter set forth.

In the drawings—Figure 1 is a vertical central longitudinal section partly in elevation through an engine casing to which my improvements are applied; Fig. 2 is a cross-section on line x—x, Fig. 1.

A A', etc., are the several cylinders of a multicylinder engine, and B is a crank case adapted for endwise insertion or removal of the crank shaft C. This shaft C is journaled in bearings, preferably ball bearings, D at opposite ends of the case.

With the construction as thus far described, all of the cylinders will communicate with a common chamber formed within the crank case but, for certain uses, as for instance as in two-cycle engine constructions, it is necessary to have a separate compartment in the case for communication with each cylinder, and this I have accomplished by the following construction: Intermediate each of the cranks for the different cylinders is arranged upon the crank shaft a disk E, the periphery of which is concentric with the axis of the shaft. Each disk is also preferably provided with a peripheral flange F and this, as shown, is formed with annular grooves in the side and peripheral faces thereof. H are annular members fitting about the peripheries of the disks E so as to form a substantially air tight joint therewith. These members are preferably formed by casting a Babbitt ring about the periphery of each disk, thereby forming a perfect fit with a very inexpensive construction. The rings H are adapted to fit in seats I formed within the crank case intermediate the several cylinders, and a similar seat ring and disk is preferably arranged at each end of the crank case. Thus the crank shaft C with the disk E and rings H permanently mounted thereon, may be inserted or removed as a unit, and when in position each of the rings H will fit within its corresponding seat to which it is secured against rotation by suitable means, such as the set screws J.

In the upper portion of each of the seats I is preferably formed an oil channel K through which oil may be introduced to lubricate the bearing for the periphery of the disk in the annular member H, and this lubricant filling the channels K will assist in forming an air tight joint.

The function of the disks E and rings H is primarily to form an air tight partition between the compartments within the case, but, if desired, these may also be constructed to form sustaining bearings for the crank shaft intermediate the cranks. The ends of the crank case are preferably formed by removable heads L which carry the bearings D and when these heads are detached clearance is provided for the removal of the disks and rings.

One of the advantages of the construction is that the overall dimension of an engine constructed in accordance with this invention may be considerably reduced over constructions in which the divisions in the crank case form a permanent part thereof. Thus the construction is particularly advantageous in the case of a multi-cylinder two-cycle engine where it is essential that each cylinder should be connected with a separate compartment. Another advantage is that the crank case may be of a construction in which the crank shaft is removed through the end of the case, whereas with multi-cylinder two-cycle engines heretofore constructed it has been necessary to divide the case longitudinally and remove the shaft by separating the sections of the case.

Where the engine is designed for two-cycles, it is necessary to limit the capacity of the crank case, and to this end filler blocks M are preferably arranged on opposite sides of the crank, and so as to clear the pitman rod. These filler blocks are of a diameter no greater than the diameter of the rings H, and, therefore, may be removed with the shaft, disks and rings through the end of the case.

What I claim as my invention is:

1. The combination with a crank case, of a crank shaft having a plurality of cranks, a disk mounted on said shaft intermediate said cranks, and an annular member peripherally engaging said disk so as to permit independent rotation of the latter and arranged concentric with the axis of said shaft, a seat within said crank case for receiving said annular member and having a channel for lubricant therein registering with a channel in said annular member for conducting the lubricant to the periphery of said revoluble disk, and means for locking said annular member in fixed position to said seat.

2. The combination with a crank shaft, of a casing having separated journal bearings for said shaft and permitting the endwise removal of the shaft therefrom, and a partition for dividing the case into a plurality of compartments arranged intermediate the bearings and removable with said shaft, said partition comprising a rotary disk mounted on this shaft, an annular member mounted upon the periphery of said disk so as to permit of the independent rotation of the latter and forming an air tight joint therewith, and a seat within said crank case for said annular member to which the latter is fixedly secured.

3. The combination with a crank shaft, of a casing having separated journal bearings for said shaft and permitting the endwise removal of the shaft therefrom, and a partition for dividing the case into a plurality of compartments arranged intermediate the bearings and removable with said shaft, said partition comprising a rotary disk having its periphery of angular cross section, a seat within the casing concentric with the disk and surrounding the latter, and a soft metal annulus fixed to the periphery of said disk and interlocking and forming a gas-tight joint with said angular section but permitting independent rotation of said disk, and means for fixedly securing said annulus to said seat.

4. The combination with a casing, of a shaft therein, a disk carried by the shaft adapted to rotate therewith, said disk having its periphery of annular cross section, an annular member formed of soft metal fixed to the seat and having a recessed portion with which the projection on the disk has a rotatable engagement, the connection between the annular member and the disk being gas-tight, and a seat within the casing to which said annular member is fixed.

5. The combination with a casing of a shaft therein, a disk fixedly secured to said shaft and arranged within the casing, said disk having a periphery of annular form, an annular seat in the casing, and a soft metal annulus fixed to the periphery of the disk and interlocking with said annular periphery but permitting independent rotation of the disk, said annulus fitting the seat and being secured thereto.

In testimony whereof I affix my signature in presence of two witnesses.

HOWARD E. COFFIN.

Witnesses:
 NELLIE KINSELLA,
 JAMES P. BARRY.